United States Patent
Xu et al.

(10) Patent No.: US 10,333,827 B2
(45) Date of Patent: Jun. 25, 2019

(54) ADAPTIVE SESSION FORWARDING FOLLOWING VIRTUAL MACHINE MIGRATION DETECTION

(71) Applicants: Meng Xu, Los Altos, CA (US); Yi Sun, San Jose, CA (US); Hsisheng Wang, Fremont, CA (US); Choung-Yaw Shieh, Palo Alto, CA (US)

(72) Inventors: Meng Xu, Los Altos, CA (US); Yi Sun, San Jose, CA (US); Hsisheng Wang, Fremont, CA (US); Choung-Yaw Shieh, Palo Alto, CA (US)

(73) Assignee: VARMOUR NETWORKS, INC., Santa Clara, CA (US)

( * ) Notice: Subject to any disclaimer, the term of this patent is extended or adjusted under 35 U.S.C. 154(b) by 393 days.

(21) Appl. No.: 13/860,404

(22) Filed: Apr. 10, 2013

(65) Prior Publication Data
US 2013/0275592 A1 Oct. 17, 2013

Related U.S. Application Data

(60) Provisional application No. 61/686,837, filed on Apr. 11, 2012.

(51) Int. Cl.
*G06F 15/173* (2006.01)
*H04L 12/721* (2013.01)
(Continued)

(52) U.S. Cl.
CPC .......... *H04L 45/14* (2013.01); *G06F 9/45558* (2013.01); *H04L 63/0209* (2013.01); *H04L 63/20* (2013.01); *G06F 2009/4557* (2013.01); *G06F 2009/45595* (2013.01); *H04L 45/02* (2013.01)

(58) Field of Classification Search
CPC ...... H04L 63/02; H04L 29/02; G06F 9/45558
See application file for complete search history.

(56) References Cited

U.S. PATENT DOCUMENTS 8,307,422 B2 * 11/2012 Varadhan et al. ............... 726/15
8,369,333 B2 * 2/2013 Hao et al. ...................... 370/392
(Continued)

*Primary Examiner* — Brian Whipple
*Assistant Examiner* — Tesfu N Mekonen
(74) *Attorney, Agent, or Firm* — Womble Bond Dickinson (US) LLP

(57) ABSTRACT

A network system includes a first network access device having an input/output (IO) module of a firewall to capture a packet of a network session originated from a first node associated with the first network access device, a first security device having a firewall processing module to determine based on the captured packet whether the first node is a destination node that is receiving VM migration from a second node that is associated with a second network access device. The first security device is to update a first flow table within the first network access device. The network system further includes a second security device to receive a message from the first security device concerning the VM migration to update a second flow table of the second network access device, such that further network traffic of the network session is routed to the first node without interrupting the network session.

20 Claims, 9 Drawing Sheets

(51) Int. Cl.
*H04L 29/06* (2006.01)
*G06F 9/455* (2018.01)
*H04L 12/751* (2013.01)

(56) References Cited

U.S. PATENT DOCUMENTS

| | | | |
|---|---|---|---|
| 8,396,986 B2* | 3/2013 | Kanada et al. | 709/238 |
| 8,429,647 B2* | 4/2013 | Zhou | G06F 9/4856 |
| | | | 709/220 |
| 8,565,118 B2* | 10/2013 | Shukla et al. | 370/254 |
| 8,935,457 B2* | 1/2015 | Feng et al. | 711/6 |
| 8,990,371 B2* | 3/2015 | Kalyanaraman et al. | 709/223 |
| 9,141,625 B1* | 9/2015 | Thornewell | G06F 17/30079 |
| 2007/0130566 A1* | 6/2007 | van Rietschote | G06F 9/45533 |
| | | | 718/1 |
| 2013/0166720 A1* | 6/2013 | Takashima et al. | 709/223 |
| 2013/0219384 A1* | 8/2013 | Srinivasan et al. | 718/1 |
| 2013/0263125 A1* | 10/2013 | Shamsee | G06F 9/45558 |
| | | | 718/1 |
| 2014/0022894 A1* | 1/2014 | Oikawa et al. | 370/229 |

\* cited by examiner

| Session ID | Address(es) of Security Processing Module(s) (e.g., IP/MAC addresses) |
|---|---|
| ⋮ | ⋮ |

FIG. 5

ADAPTIVE SESSION FORWARDING FOLLOWING VIRTUAL MACHINE MIGRATION DETECTION

RELATED APPLICATIONS

This application claims the benefit of U.S. Provisional Patent Application No. 61/686,837, filed Apr. 11, 2012, which is incorporated by reference in its entirety.

FIELD OF THE INVENTION

Embodiments of the present invention relate generally to network security. More particularly, embodiments of the invention relate to changing security session forwarding when detecting network event of virtual machine migration.

BACKGROUND

Virtual machine live migration is an important feature that it allows a network administrator to move virtual machines to another physical host without interrupting operation during the live migration. However, if there is a security device, such as gateway or firewall, protecting the virtual machine in front of the original physical host, once the virtual machine is moved to another physical host, the data connections to the virtual machine would be disconnected. This would interrupt data traffic and stop current operation of the virtual machine.

Traditionally, virtual machine live migration is detected by querying a virtual machine management system and retrieving the operation information. This is done by using the API (Application Programming Interface) being provided by the virtual machine management system. However, each virtual machine management system provides a different access method and the API may change overtime. This method also requires network security devices constantly connect to the virtual machine management system, which is not efficient and sometime it is not practical.

BRIEF DESCRIPTION OF THE DRAWINGS

Embodiments of the invention are illustrated by way of example and not limitation in the figures of the accompanying drawings in which like references indicate similar elements.

FIG. 5 is a block diagram illustrating a forwarding table according to one embodiment of the invention.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a mechanism of detecting network event of virtual machine live migration and modified security session forwarding of a network security device is utilized to maintain the data connection running without interruption during the virtual machine (VM) migration. In one embodiment, the mechanism is to detect network events of virtual machine live migration, thus there is no dependency of the virtual machine management system. Once a network security device (e.g., network access device or firewall) detects these packets, it can change the security session forwarding of all connections of the virtual machine to the new location. The security sessions will forward all relate packet traffic to the new location of the virtual machine, thus data operation is not interrupted. The network event detection and the security session forwarding changes could happen on different network security devices. There could be a network security device detecting the virtual machine live migration happening, and notifying another network security device which is handling the security operation in the original physical host of the virtual machine.

Figure 1:
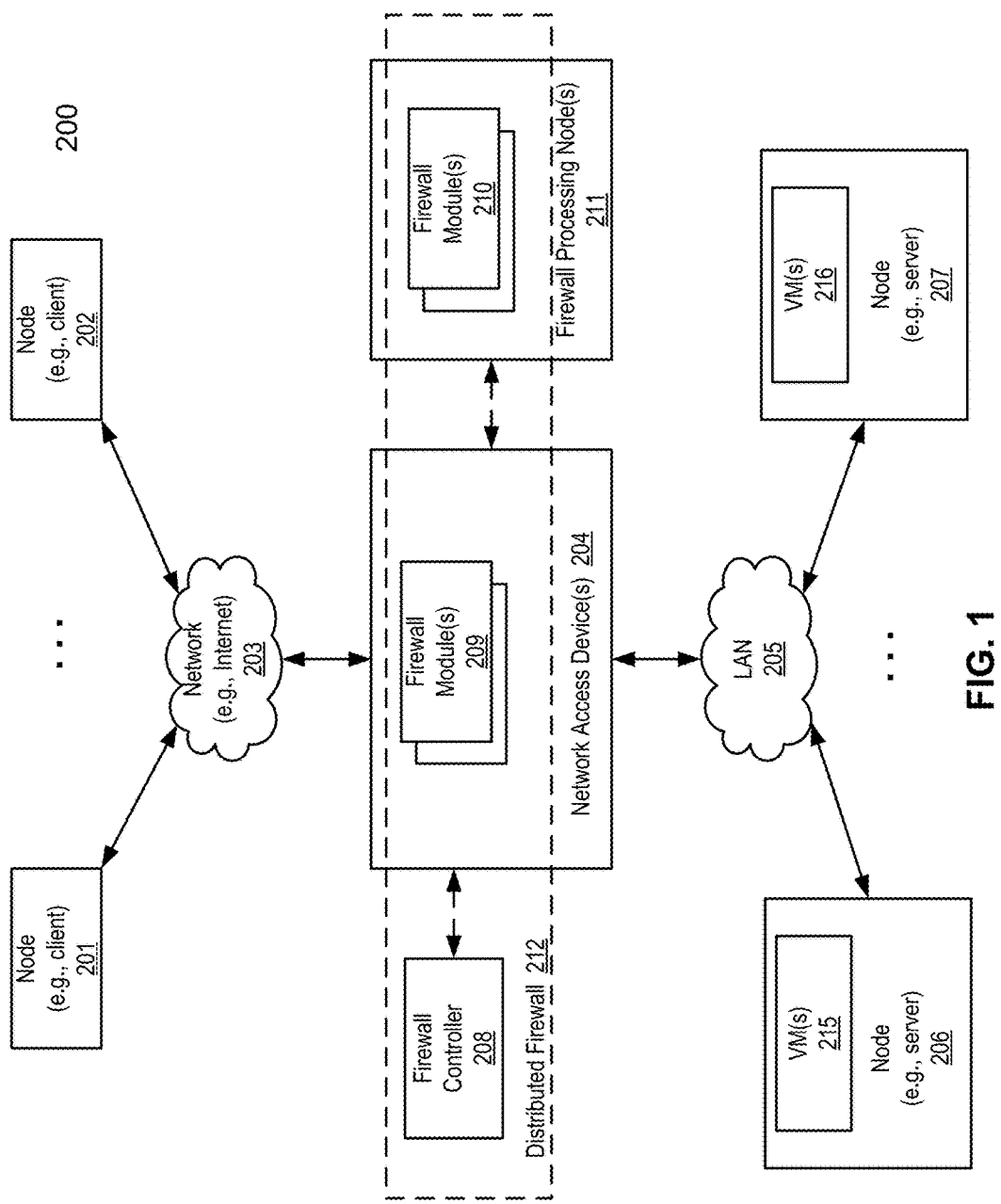
FIG. 1 is a block diagram illustrating an example of a network configuration according to one embodiment of the invention.

FIG. 1 is a block diagram illustrating an example of network configuration according to one embodiment of the invention. Referring to FIG. 1, network access device 204, which may be a router or gateway, a switch or an access point, etc., provides an interface between network 203 and network 205. Network 203 may be an external network such as a wide area network (WAN) (e.g., Internet) while network 205 represents a local area network (LAN). Nodes 206-207 go through gateway device 204 in order to reach nodes 201-202, or vice versa. Any of nodes 201-202 and 206-207 may be a client device (e.g., a desktop, laptop, Smartphone, gaming device) or a server.

According to one embodiment, network access device 204 is associated with a distributed firewall 212 that includes various firewall processing modules, for example, each being executed within a virtual machine (VM). In one embodiment, each firewall module is responsible for performing one or more firewall functions, but it does not include all of the firewall functions of a firewall. Examples of the firewall functions include, but are not limited to, network address translation (NAT), virtual private network (VPN), deep packet inspection (DPI), and/or anti-virus, etc. In one embodiment, some of the firewall processing modules are located within network access device 204 (e.g., firewall modules 209) and some are located external to network access device 204 (e.g., firewall modules 210 maintained by firewall processing node(s) 211, which may be a dedicated firewall processing machine. All of the firewall modules 209-210 are managed by firewall controller 208, which may be located within network access device 204, or external to network access device 204, such as, for example, in a public cloud associated with network 203, or in a private cloud associated with network 205. Controller 208 and firewall processing modules 209-210 collectively are referred to herein as distributed firewall 212.

A virtual machine represents a completely isolated operating environment with a dedicated set of resources associated therewith. A virtual machine may be installed or launched as a guest operating system (OS) hosted by a host OS. In one embodiment, a host OS represents a virtual machine monitor (VMM) (also referred to as a hypervisor) for managing the hosted virtual machines. A guest OS may be of the same or different types with respect to the host OS. For example, a guest OS may be a Windows™ operating system and a host OS may be a LINUX operating system. In addition, the guest operating systems (OSes) running on a host can be of the same or different types. A virtual machine can be any type of virtual machine, such as, for example, hardware emulation, full virtualization, para-virtualization, and operating system-level virtualization virtual machines. Different virtual machines hosted by a server may have the same or different privilege levels for accessing different resources.

According to one embodiment, when VM 215 of node 206 is migrated to VM 216 of node 207, network access device 204 detects certain network events or messages that typically occur during or after the VM migration. In this example, distributed firewall 212 operates as a security device to nodes 206-207. In response to the detection, certain routing or forwarding tables (e.g., flow table or session table) of network access device 204 are modified, such that subsequent incoming packets can be properly routed to VM 216 of node 207 without having to terminating the current connection session during the virtual machine (VM) migration. The network event detection and the security session forwarding modifications can be performed on different network security devices. There could be a network security device detecting the occurrence of the virtual machine live migration, and notifying another network security device which is handling the security operation in the original physical host of the virtual machine.

Figure 2:
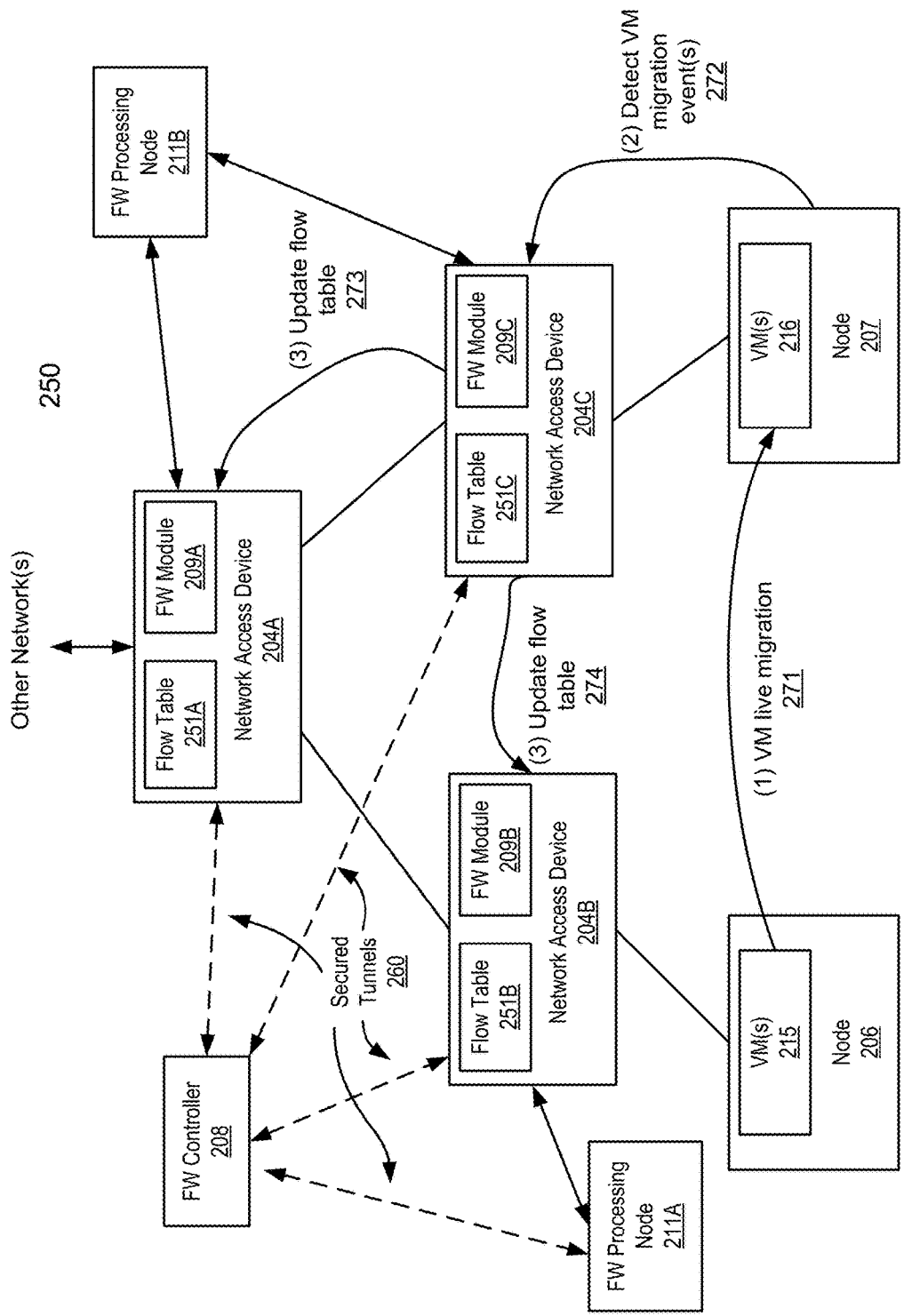
FIG. 2 is a block diagram illustrating an example of a network configuration according to another embodiment of the invention.

FIG. 2 is a block diagram illustrating an example of network configuration according to another embodiment of the invention. System 250 may represent at least part of system 200 as shown in FIG. 1. Referring to FIG. 2, in this embodiment, multiple network access devices such as devices 204A-204C are arranged in a hierarchical structure, where each network access device provides an interface of a corresponding LAN or local network segment to an external network. For example, network access device 204B provides an interface of a LAN having at least one member such as node 206 to an external network or network segment that is hosted by network access device 204A. Similarly, network access device 104C provides an interface for its members such as node 207. The LANs associated with network access devices 204B-204C may be located within a physical site or a data center or alternatively, they may be allocated across multiple physical sites or data centers.

According to one embodiment, each of network access devices 204A-204C maintains a persistent connection such as secure connections or tunnels 260 with a controller or management entity 208 for exchanging management messages and configurations, or distributing routing information to network access devices 204A-204C, etc. In one embodiment, controller 208 communicates with each of the network access devices 204A-204C using a management protocol such as the OpenFlow™ protocol. OpenFlow is a Layer 2 communications protocol (e.g., media access control or MAC layer) that gives access to the forwarding plane of a network switch or router over the network. In simpler terms, OpenFlow allows the path of network packets through the network of switches to be determined by software running on multiple routers (minimum two of them, primary and secondary, having a role of observers). This separation of the control from the forwarding allows for more sophisticated traffic management than is feasible using access control lists (ACLs) and routing protocols.

The OpenFlow technology consists of three parts: flow tables installed on switches, a controller and an OpenFlow protocol for the controller to talk securely with switches. Flow tables are set up on switches or routers. Controllers talk to the switches via the OpenFlow Protocol, which is secure, and impose policies on flows. For example, a simple flow might be defined as any traffic from a given IP address. The rule governing it might be to route the flow through a given switch port. With its knowledge of the network, the controller could set up paths through the network optimized for speed, fewest number of hops or reduced latency, among other characteristics. Using OpenFlow can take control of how traffic flows through the network out of the hands of the infrastructure, the switches and routers, and puts it in the hands of the network owner (such as a corporation), individual users or individual applications.

Referring back to FIG. 2, in one embodiment, each of the network access devices 204A-204C maintains a flow table or session table (e.g., flow tables 251A-251C) and a firewall module (e.g., 209A-209C). A network flow refers to a sequence of packets from a source computer to a destination, which may be another host, a multicast group, or a broadcast domain. For example, a TCP/IP flow can be uniquely identified by the following parameters within a certain time period: 1) Source and Destination IP address; 2) Source and Destination Port; and 3) Layer 4 Protocol (TCP/UDP/ICMP). A session is a semi-permanent interactive information interchange, also known as a dialogue, a conversation or a meeting, between two or more communicating devices. A session is set up or established at a certain point in time and torn down at a later point in time. An established communication session may involve more than one message in each direction. A session is typically, but not always, stateful, meaning that at least one of the communicating parts needs to save information about the session history in order to be able to communicate, as opposed to stateless communication, where the communication consists of independent requests with responses. Flow tables 251A-251C may be implemented as a combination of a flow table and a session table.

Firewall modules 209A-209C may be part of a distributed firewall described above. For example, firewall modules 209A-209C may be the IO functions of a firewall while nodes 211A-211B may be firewall processing nodes. That is, modules 211A-211B may be dedicated firewall processing devices that perform some firewall processing operations such as DPI, content inspection, antivirus, etc., while firewall modules 209A-209C are responsible for routing data packets. For example, when firewall module 209B receives a packet from node 206, it may forward the packet to firewall processing node 211A for content inspection and/or forwards the packet to controller 208 for routing information. In response, firewall processing node 211A analyzes the received packet and/or may further communicate with controller 208. Controller 208 may provide further routing information back to network access device 204B regarding how to route the packet. Each of the firewall processing nodes 211A-211B may further maintains a persistent connection or tunnel with controller 208, for example, using the OpenFlow communication protocol.

According to one embodiment, when VM migration is performed from VM 215 of node 206 to VM 216 of node 207 via path 271, typically, node 207 may broadcast certain events in the associated local network. Such events may be captured or received via path 272 by firewall 209C of network access device 204C. Based on the captured events, firewall module 209C may recognize or determine that the VM migration has occurred. In response, in addition to updating flow table 251C, firewall module 209C notifies, via paths 273-274, firewall modules 209A-209B to allow the network access devices 204A-204B to update their respective flow tables 251A-251B, such that the current session to VM 215 can be seamlessly routed to VM 216 without interruption or terminating the session. An example of a flow table is shown in FIG. 5. Note that processing nodes 211A-211B and/or network access devices 204A-204C may collectively be referred to as one or more security devices that provide protection to nodes 206-207.

In general, virtual machine live migrations generate certain network events after the live migration. For VMware vCenter™, the VM manager such as, for example, a hypervisor, sends out a RARP (Reverse Address Resolution Protocol) packet after VM migration. For Xen™ or Microsoft Hyper-V™, it sends out an ARP or broadcast ARP reply packet to the network. These packets can be detected as a network event after live migration. Once a network security device detects these packets, it can change the security session forwarding of all connections of the virtual machine to the new location. The security sessions will forward all related packet traffic to the new location of the virtual machine, thereby ensures that data operations are not interrupted. To reduce a false positive with respect to the detection of virtual machine live migration network events, according to one embodiment, one can combine the detection of RARP or ARP reply packets (or other similar network event after virtual machine live migration) with the traffic volume of virtual machine live migration, as the indication of virtual machine live migration. In one embodiment, the detection mechanism is triggered only when a certain amount of traffic is transferred to the new physical host through the live migration protocol (e.g., amount of incoming packets exceeds a predetermined threshold), before the network event packet is sent out. The combination of these two events would reduce the occurrence of a false positive with respect to detecting virtual machine live migration detection. The network event detection and the security session forwarding changes could happen on different network security devices. There could be a network security device detecting the occurrence of virtual machine live migration, and notifying another network security device which is handling the security operation in the original physical host of the virtual machine. The separation of event detection and security enforcement could enable distributed network security inside the data center.

Figure 3:
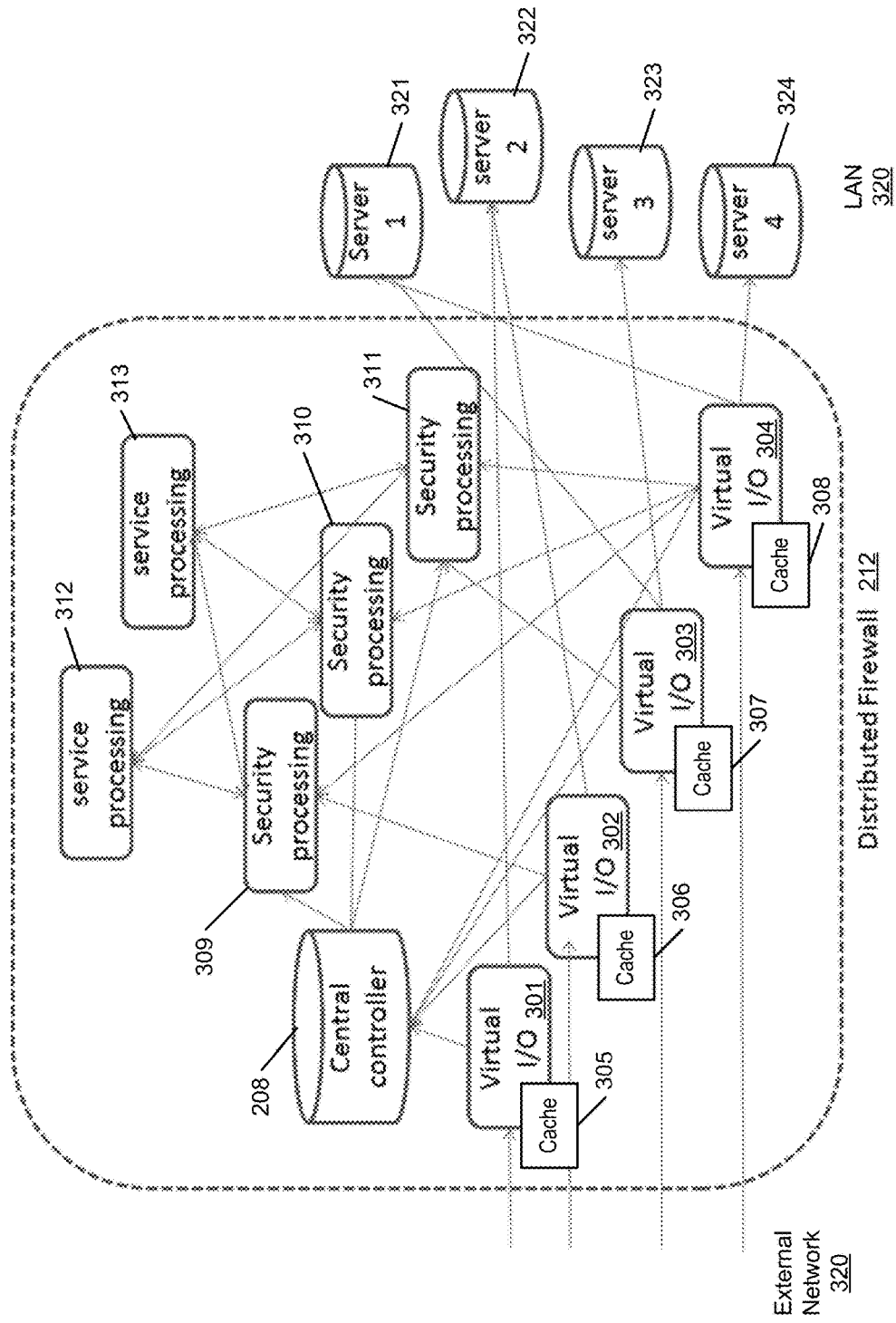
FIG. 3 is a block diagram illustrating an example of a distributed firewall according to one embodiment of the invention.

FIG. 3 is a block diagram illustrating an example of a distributed firewall according to one embodiment of the invention. Referring to FIG. 3, distributed firewall 212 includes, for the purpose of illustration, four different types of modules: virtual I/O modules 301-304, security processing modules 309-311, service processing modules 312-313, and central controller 208. All these modules can run on the same virtual machine, or on different virtual machines, or on same or different physical hosts. In one embodiment, the communication protocol between the modules is IPC (inter-process communication) if they run on the same memory space, or use layer-2 network protocol if they are on the same layer-2 network, or use IP protocols if they are connected through IP networks. Some or all of modules 301-304 and 309-313 may be executed within a virtual machine. Dependent upon the specific configuration, each of the modules 301-304 and 309-313 may be executed by a respective virtual machine. In other configurations, multiple of modules 301-304 and 309-313 may be executed by the same virtual machine.

An I/O module running within a virtual machine is referred to herein as a virtual I/O module. Each of virtual I/O modules 301-304 receives packets from any of servers 321-324 of LAN 320 and sends packets to external network 315 outside of the firewall. In one embodiment, each of I/O modules 301-304 keeps a local cache (e.g., caches 305-308) storing location(s) of a security processing module(s) (e.g., security processing modules 309-311) for each connection session. A cache maintained by each I/O module contains a forwarding table mapping certain connection sessions to any of security modules 309-311. An example of a forwarding table is shown in FIG. 5. Upon receiving a packet, an I/O module performs a packet classification to find out the associated connection and forwards the packet to the corresponding security processing module identified by the forwarding table. If it cannot find the connection in its local cache, the packets are forwarded to central controller 208 for processing. In such a case, controller 208 assigns the connection to one of security processing modules 309-311 based on one or more of a variety of factors such as load balancing. The virtual I/O modules 302-304 can be located at multiple locations of the networks to receive and send out packets.

In one embodiment, each of security processing modules 309-311 performs major security processing functions, such as, for example, NAT, VPN, DPI, and/or anti-virus, etc. A security processing module receives packets and runs the packets through one or more various security functions in the module for security processing. There could be several security modules and each handles the same or different security functions. If the packets need to go through another security or service processing, the module sends the packets to the other modules. Optionally, it can run the packets through a load balancing mechanism to distribute the load to multiple modules. If a module is the last processing module in the chain to process the packets, it can forward the packets back to the virtual I/O module to send out, or send the packet out directly to its destination if it's configured to do so.

In one embodiment, each of service processing modules 312-313 performs one or more of the functions of security processing module, such as, for example, NAT, VPN, DPI, and/or anti-virus, etc. However, it is different from the security processing module in that it only receives and sends packets to the same security processing module. If the tasks cannot be done in a security processing module, for example, due to a resource limitation, system load, or the requirement of a different operation system, the packets can be forwarded to one or more of service processing modules 312-313 for further processing. The packets then are sent back to the same security processing module for the next security function processing. To further share the system load, any of security processing modules 309-311 can load balance the computational-intensive services to multiple service processing modules.

In one embodiment, central controller 208 is the central place to control forwarding of the packets are forwarded amongst I/O modules 301-304, security processing modules 309-311, and service processing modules 312-313. When a virtual I/O module receives a packet, according to one embodiment, it forwards the packet to central controller 208 if it cannot find an existing connection in its local cache, as shown in FIG. 5. When central controller 208 receives the packet, it decides which of security processing modules 309-311 is able to process the packets, and then forwards the packets to the designated security processing module. It also instructs the virtual I/O module to create the local cache to store connection state information so the subsequent packets of the same connection session do not need to be forwarded to central controller 208; rather, they can be directly forwarded to the proper security processing module identified in the cache.

By dividing a firewall into different modules, it allows putting virtual I/O and security processing functions at the best locations to protect the network entrance, while keeping the central control and monitoring functionality at the central controller. It also enhances the scalability of the system since all modules can be expanded to multiple instances to share the system load. Note that a service processing module is optional in the architecture, as it is only required when there are needs to use additional resources to handle the security functions.

Figure 6:
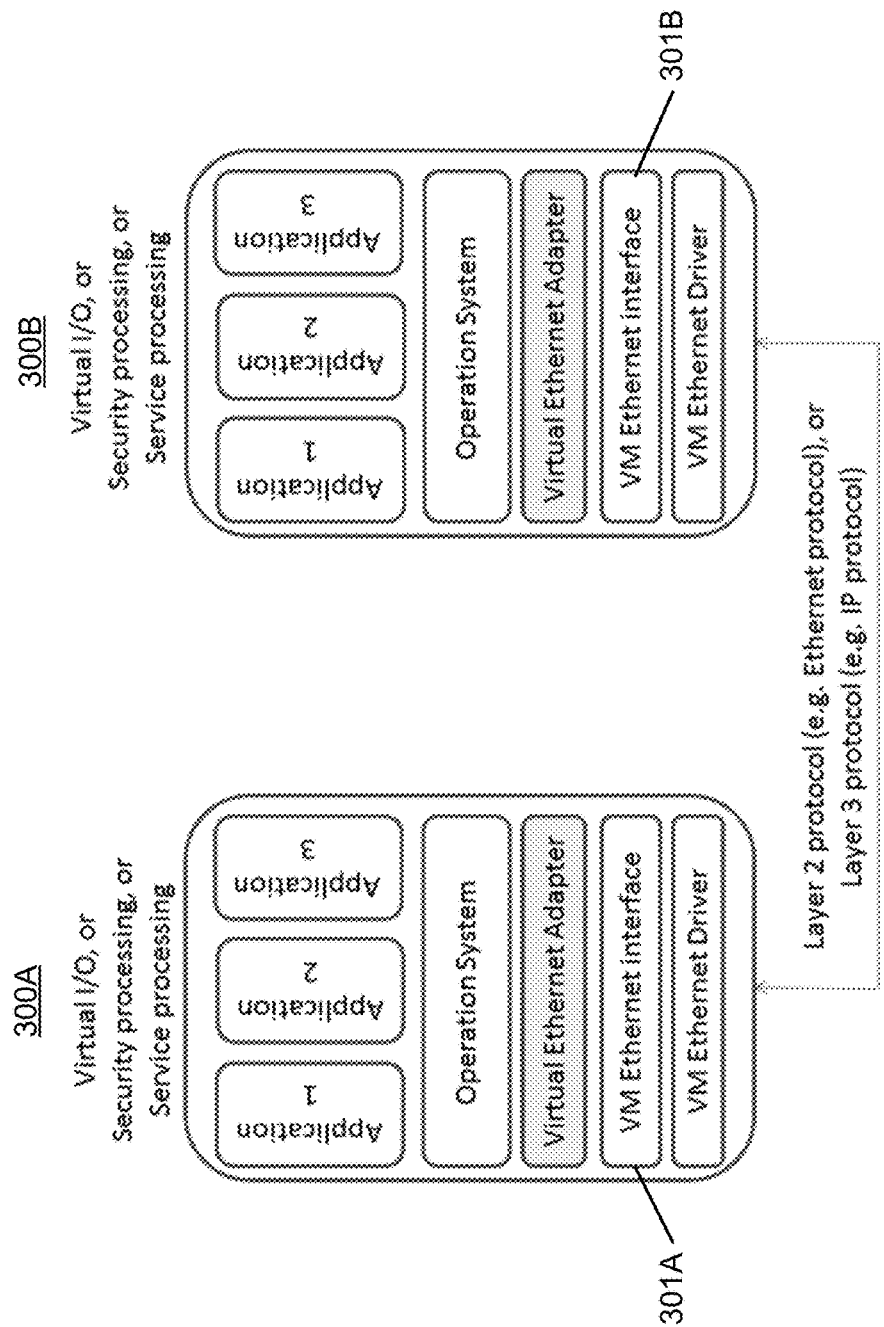
FIG. 6 is a block diagram illustrating an architecture of a processing module according to one embodiment of the invention.

FIG. 6 is a block diagram illustrating architecture of a processing module according to one embodiment of the invention. Referring to FIG. 6, any of processing modules 300A and 300B can be implemented as part of any of the firewall modules (e.g., I/O module, security processing module, or service processing module) as shown in FIG. 3. In the example as shown in FIG. 6, multiple possible communication protocols can be utilized for the packet forwarding between firewall modules. If the firewall modules are on the same layer-2 networks, the packet can be forwarded through a layer-2 protocol, such as Ethernet protocol. In this example, it is assumed that each of firewall modules 300a-300B has a dedicated virtual Ethernet interface (e.g., interfaces 301A and 301B) being used for the forwarding link and the packets are sent with Ethernet header of both sides' media access control (MAC) addresses. The packets can also be forwarded in a layer-3 protocol such as an IP protocol. During the layer-3 routing, original packets are encapsulated with another IP header, which carries the IP address of both sides. The encapsulation of the outer IP address would ensure the packets are sent, and received from the proper peer.

In one embodiment, firewall modules 300A and 300B can run on virtual machines or physical hosts. Running on virtual machines provides additional benefit that a firewall module can be added dynamically. Initially the distributed firewall may have only one virtual I/O module, one security processing module, and a central controller. When there is more traffic coming, it can add more virtual I/O modules to support increasing connections. If it needs more CPU resources to handle the security processing, it may add more security processing modules and/or add more service processing modules, to support the increasing load. This provides lots of flexibility to support various network conditions.

In one embodiment, firewall modules 300A-300B could be distributed in different networks, even on different locations, as long as the modules can reach the module that is next in terms of processing and the central controller. In one embodiment, virtual I/O modules and corresponding security processing modules are in a public cloud and the central controller is in a private cloud. This configuration may provide the flexibility to secure and control packets coming from the public cloud, and allow central controller having overall view of traffic from Internet as well as from internal network.

One of the advantages of embodiments of the present invention includes, but not limited to, that the distributed firewall can employ a significantly large amount of CPU and memory resources for service processing and protect the networks at multiple geometric locations. The central controller decides which security processing module capable of processing particular connection, and is able to start a new security processing at the place deemed best for packet processing.

As a result, the location of the packet I/O is not limited on a single appliance. The I/O modules can be placed anywhere as virtual machines. The security processing power is significantly higher as packets and connections can be load balanced to any number of the security processing modules, and the modules could be added or deleted dynamically. Using such modules in a firewall cloud provides a security design that is best-fit for the emerging cloud computing, and provides great scalability and system availability.

Figure 7:
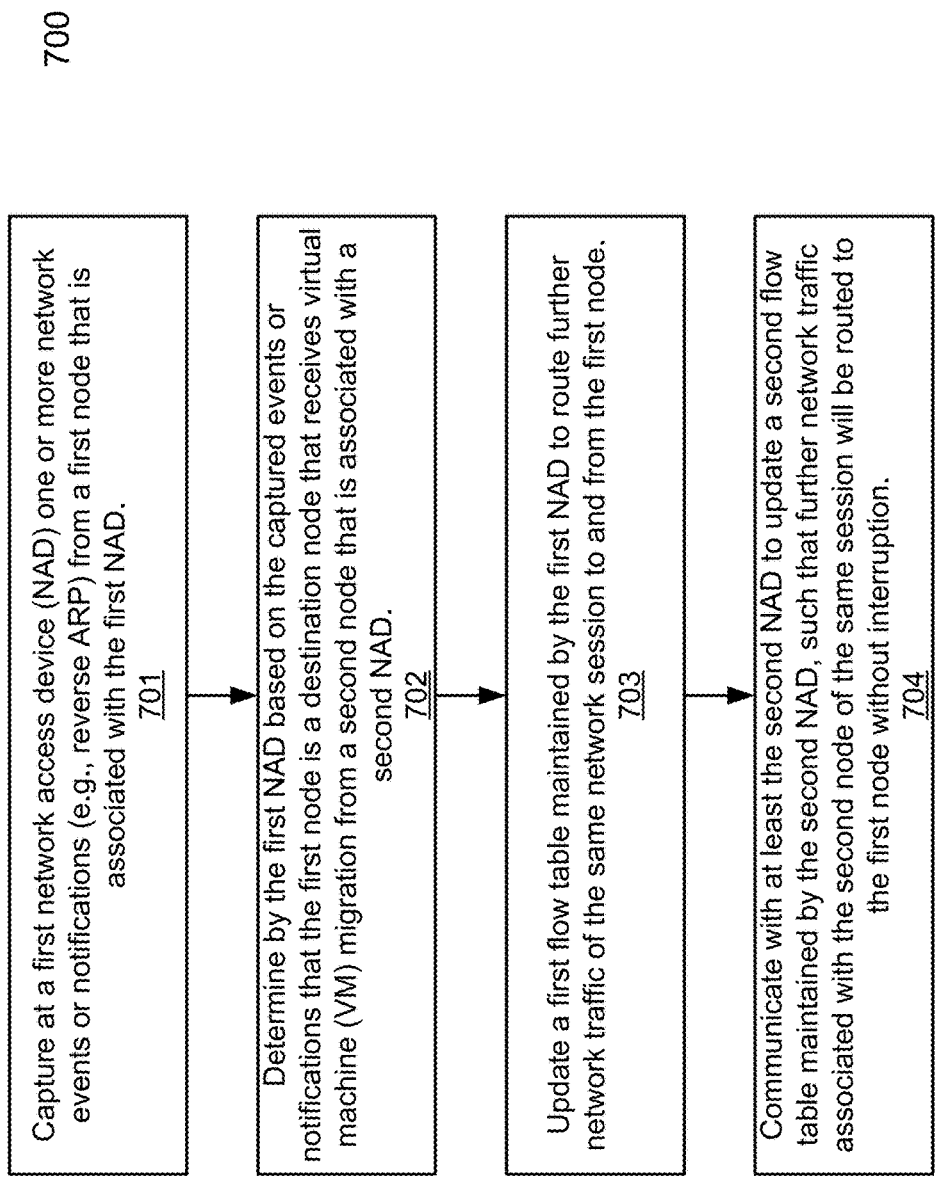
FIG. 7 is a flow diagram illustrating a method for performing firewall operations using a distributed firewall according to one embodiment of the invention.

FIG. 7 is a flow diagram illustrating a method for performing firewall operations using a distributed firewall according to one embodiment of the invention. Method 700 may be performed by processing logic that may include software, hardware, or a combination of both. For example, method 700 may be performed by distributed firewall 212 of FIG. 1. Referring to FIG. 7, at block 701, processing logic captures at a first network access device one or more network events or notifications (e.g., one or more RARP or ARP packets) from a first node that is associated with the first network access device (NAD). At block 702, processing logic determines based on the captured events that the first node is a destination node that is receiving a virtual machine migration from a second node that is associated with a second NAD. In response at block 703, processing logic updates a first flow table locally to route further network traffic of the same network session to and from the first node. In addition at block 704, processing logic communicates with at least the second NAD to update a second flow table maintained by the second NAD. As a result, further network traffic associated with the second node of the same session will be routed to the first node without interruption and without having to involve a centralized management entity.

Figure 4:
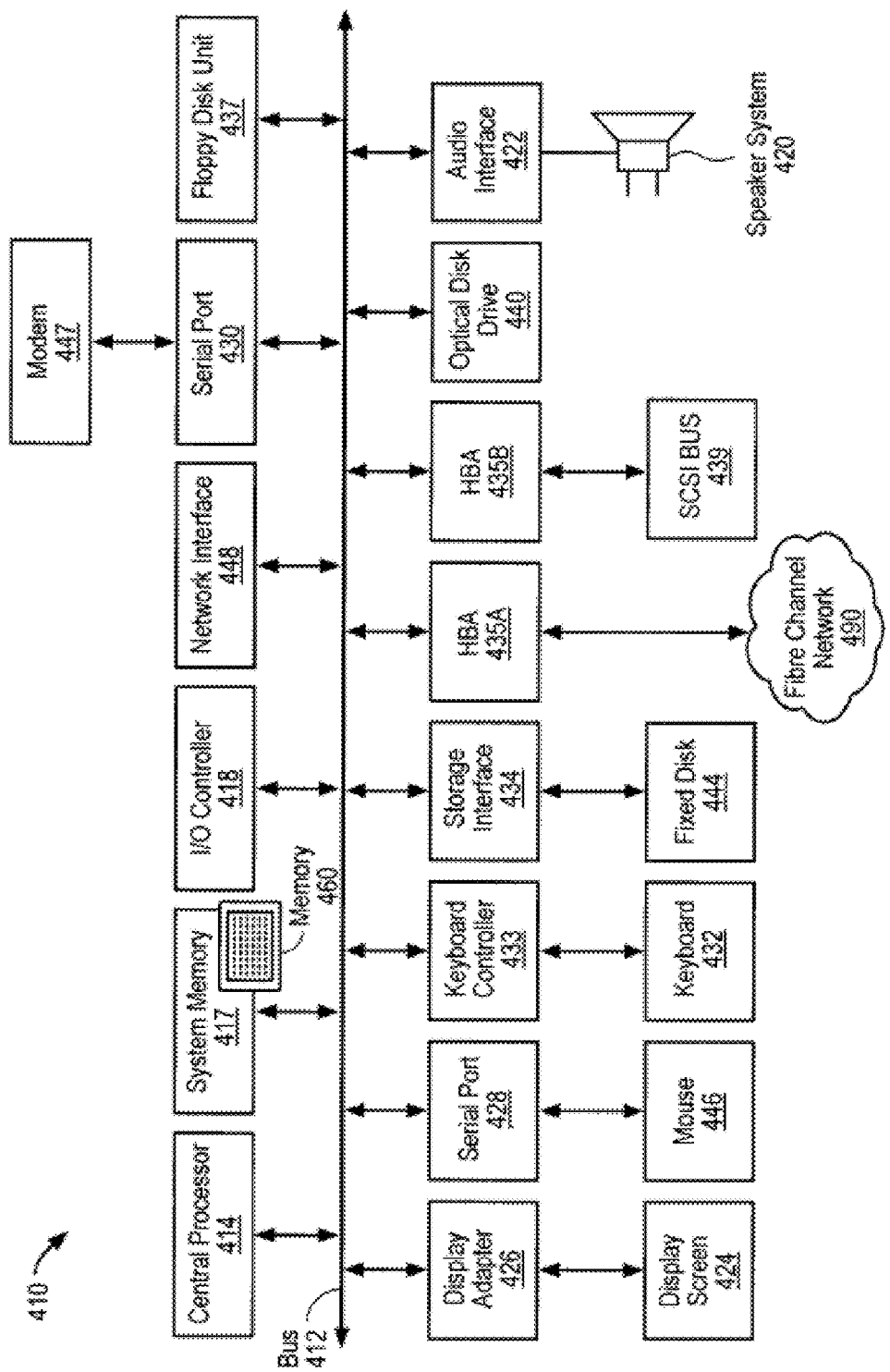
FIG. 4 is a block diagram illustrating an example of a data processing system which may be used as an embodiment of the invention.

FIG. 4 is a block diagram illustrating an example of a data processing system which may be used as an embodiment of the invention. For example, system 410 may be implemented as part of network access device 204 or alternatively, system 410 may be implemented as part of a client or server device. In one embodiment, system 410, which may operate as a gateway device, includes a memory, a second interface to receive one or more packets from the one or more virtual machines, and one or more processors. Referring to FIG. 4, gateway 410 includes a bus 412 to interconnect subsystems of gateway 410, such as a processor 414, a system memory 417 (e.g., RAM, ROM, etc.), an input/output controller 418, an external device, such as a display screen 424 via display adapter 426, serial ports 428 and 430, a keyboard 432 (interfaced with a keyboard controller 433), a storage interface 434, a floppy disk drive 437 operative to receive a floppy disk 438, a host bus adapter (HBA) interface card 435A operative to connect with a Fibre Channel network 490, a host bus adapter (HBA) interface card 435B operative to connect to a SCSI bus 439, and an optical disk drive 440. Also included are a mouse 446 (or other point-and-click device, coupled to bus 412 via serial port 428), a modem 447 (coupled to bus 412 via serial port 430), and a network interface 448 (coupled directly to bus 412).

Bus 412 allows data communication between central processor 414 and system memory 417. System memory 417 (e.g., RAM) may be generally the main memory into which the operating system and application programs are loaded. The ROM or flash memory can contain, among other code, the Basic Input-Output system (BIOS) which controls basic hardware operation such as the interaction with peripheral components. Applications resident with computer system 410 are generally stored on and accessed via a computer readable medium, such as a hard disk drive (e.g., fixed disk 444), an optical drive (e.g., optical drive 440), a floppy disk unit 437, or other storage medium.

Storage interface 434, as with the other storage interfaces of computer system 410, can connect to a standard computer readable medium for storage and/or retrieval of information, such as a fixed disk drive 444. Fixed disk drive 444 may be a part of computer system 410 or may be separate and accessed through other interface systems.

Modem 447 may provide a direct connection to a remote server via a telephone link or to the Internet via an internet service provider (ISP). Network interface 448 may provide a direct connection to a remote server. Network interface 448 may provide a direct connection to a remote server via a direct network link to the Internet via a POP (point of presence). Network interface 448 may provide such connection using wireless techniques, including digital cellular telephone connection, a packet connection, digital satellite data connection or the like.

Many other devices or subsystems (not shown) may be connected in a similar manner (e.g., document scanners, digital cameras and so on). Conversely, all of the devices shown in FIG. 4 need not be present to practice the techniques described herein. The devices and subsystems can be interconnected in different ways from that shown in FIG. 4. The operation of a computer system such as that shown in FIG. 4 is readily known in the art and is not discussed in detail in this application.

Code to implement the gateway operations described herein can be stored in computer-readable storage media such as one or more of system memory 417, fixed disk 444, optical disk 442, or floppy disk 438. The operating system provided on computer system 410 may be MS-DOS®, MS-WINDOWS®, OS/2®, UNIX®, Linux®, or another known operating system.

Figure 8:
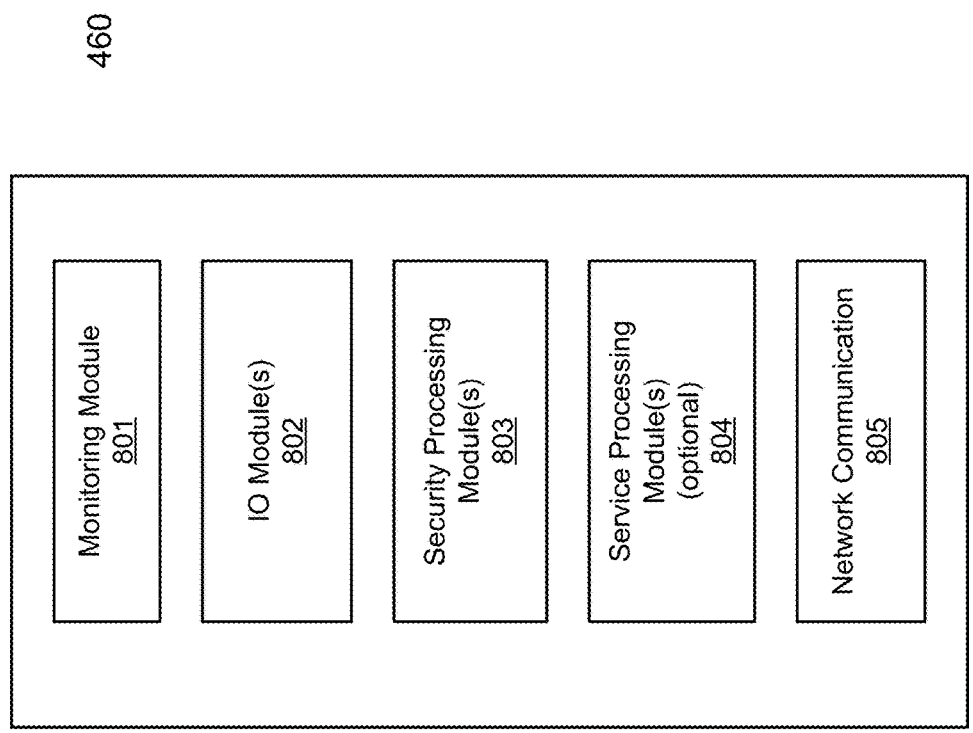
FIG. 8 illustrates a set of code (e.g., programs) and data that is stored in memory of one embodiment of a security gateway according to one embodiment.

FIG. 8 illustrates a set of code (e.g., programs) and data that is stored in memory of one embodiment of a security gateway, such as the security gateway set forth in FIG. 4. The security gateway uses the code, in conjunction with a processor, to implement the necessary operations (e.g., logic operations) to implement the described herein.

Referring to FIG. 8, the memory 460 includes a monitoring module 801 which when executed by a processor is responsible for performing traffic monitoring of traffic from the VMs as described above. Memory 460 also stores one or more IO modules 802 which, when executed by a processor, is responsible for performing forwarding inbound and outbound packets. Memory 460 further stores one or more security processing modules 803 which, when executed by a processor, is responsible for security processes on the packets provided by IO modules 802. Memory 460 also stores one or more optional service processing modules 804, which when executed by a processor performs a particular security process on behalf of security processing modules 803. The memory also includes a network communication module 805 used for performing network communication and communication with the other devices (e.g., servers, clients, etc.).

As described above, the servers in FIG. 1 may be implemented using a computer system. In one embodiment, one or more of the servers is implemented using a system such as depicted in FIG. 4 as well, except using different code to implement the techniques and operations performed by such servers and their VMs as described above. The code is stored in computer-readable storage medium such as system memory 417, fixed disk 444, optical disk 442 or floppy disk 448.

Figure 9:
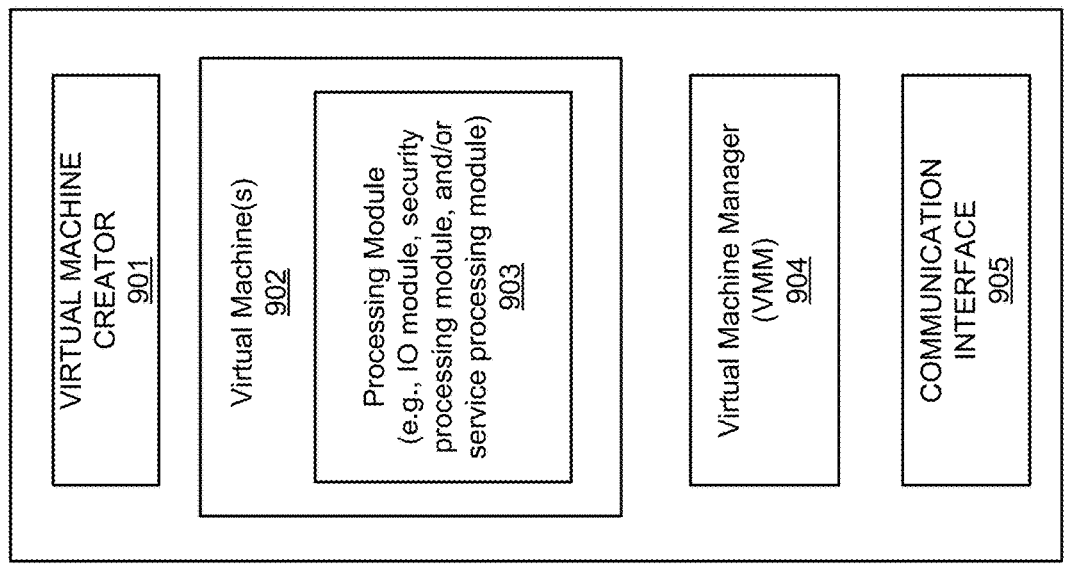
FIG. 9 illustrates a set of code (e.g., programs) and data that is stored in memory according to one embodiment.

FIG. 9 illustrates a set of code (e.g., programs) and data that is stored in one of those memories. In one embodiment of the server, such as implemented using the system shown in FIG. 4. The server uses the code, in conjunction with the processor, to implement the necessary operations to implement the discovery process depicted above, such as, for example, the operation set forth in FIG. 7. Referring to FIG. 9, the memory 900 includes virtual machine creation module 901 which when executed by a processor is responsible for creating a virtual machine on the server in a manner well-known in the art. Memory 900 also includes one or more virtual machines 902 which may be created by virtual machine creator 901. Virtual machine 902 includes a processing module 903 executed therein, which can be one or more of an IO module, a security processing module, and/or a service processing module. Memory 600 further includes virtual machine manager (VMM) 904 responsible for managing virtual machines 902. Memory 600 also includes communication interface module 605 used for performing communication with other devices (e.g., security gateway, servers, clients, etc.).

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
   capturing at a first firewall of a first network access device a packet of a network session originated from a first node associated with the first network access device, wherein the packet is identified by the first firewall of the first network device as a specific type of packet indicative of an occurrence of a live migration of a virtual machine (VM);
   determining, by a first firewall processing device associated with but separated from the first network access device in response to receipt of the packet captured by the first firewall of the first network device, that the first node is a destination node of a VM migration from a second node that is associated with a second network access device, wherein the first node is determined to be the destination node of the live migration of the VM when the first network access device both identifies the packet as the specific type of packet and determines that an amount of incoming packets of network traffic transferred to the first node by a live migration transfer protocol prior to the specific type of packet being captured by the first network access device exceeds a predetermined threshold;
   in response to the determination that the first node is the destination node of the VM migration by the first firewall processing device, the first firewall processing device updating a first flow table within the first network access device for routing further packets of the network session to and from the first node; and
   transmitting a message to the second network access device to allow the second access device to update a second flow table within the second network access device in response to receipt of the message, such that further network traffic of the network session will be routed to the first node without interrupting the network session.

2. The method of claim 1, wherein the specific type of the captured packet is an address resolution protocol (ARP) packet or a reverse ARP (RARP) packet transmitted by the first node.

3. The method of claim 1, wherein the first node is a member of a first local area network (LAN) hosted by the first network access device and the second node is a member of a second LAN hosted by the second network access device.

4. The method of claim 1, wherein the first firewall is an IO firewall virtual machine executed by the first network access device, and wherein the packet is captured by an input/output (IO) module of the IO firewall virtual machine within the first network access device.

5. The method of claim 4, wherein the first firewall processing device executes a first firewall services processing virtual machine that communicates with the first IO firewall virtual machine to update the first flow table and communicates with the second network access device to update the second flow table.

6. The method of claim 4, wherein the first firewall services processing VM executed by the first firewall processing device updates the first flow table of the first network access device using the IO firewall virtual machine and communicates with a second firewall services processing VM executed by a second firewall processing device associated with the second network access device, wherein the second firewall services processing VM executed by the second firewall processing device instructs a second TO firewall virtual machine executed by the second network access device to update the second flow table.

7. The method of claim 4, wherein the TO firewall virtual machine and a first firewall services processing virtual machine executing at the firewall processing device collectively represents a distributed firewall.

8. A non-transitory computer-readable medium having instructions stored therein, which when executed by a computer, cause the computer to perform a method, the method comprising:
   capturing at a first firewall of a first network access device a packet of a network session originated from a first node associated with the first network access device, wherein the packet is identified by the first firewall of the first network device as a specific type of packet indicative of an occurrence of a live migration of a virtual machine (VM);
   determining, by a first firewall processing device associated with but separated from the first network access device in response to receipt of the packet captured by the first firewall of the first network device, that the first node is a destination node of a VM migration from a second node that is associated with a second network access device, wherein the first node is determined to be the destination node of the live migration of the VM when the first network access device both identifies the packet as the specific type of packet and determines that an amount of incoming packets of network traffic transferred to the first node by a live migration transfer protocol prior to the specific type of packet being captured by the first network access device exceeds a predetermined threshold;
   in response to the determination that the first node is the destination node of the VM migration by the first firewall processing device, the first firewall processing device updating a first flow table within the first network access device for routing further packets of the network session to and from the first node; and transmitting a message to the second network access device to allow the second access device to update a second flow table within the second network access device in response to receipt of the message, such that further network traffic of the network session will be routed to the first node without interrupting the network session.

9. The non-transitory computer-readable medium of claim 8, wherein the specific type of the captured packet is an address resolution protocol (ARP) packet or a reverse ARP (RARP) packet transmitted by the first node.

10. The non-transitory computer-readable medium of claim 8, wherein the first node is a member of a first local area network (LAN) hosted by the first network access device and the second node is a member of a second LAN hosted by the second network access device.

11. The non-transitory computer-readable medium of claim 8, wherein the first firewall is an TO firewall virtual machine executed by the first network access device, and wherein the packet is captured by an input/output (IO) module of the IO firewall virtual machine within the first network access device.

12. The non-transitory computer-readable medium of claim 11, wherein the first firewall processing device executes a first firewall services processing virtual machine communicates with the first IO firewall virtual machine to update the first flow table and communicates with the second network access device to update the second flow table.

13. The non-transitory computer-readable medium of claim 11, wherein the first firewall services processing VM executed by the first firewall processing device updates the first flow table of the first network access device using the TO firewall virtual machine and communicates with a second firewall services processing VM executed by a second firewall processing device associated with the second network access device, wherein the second firewall services processing VM executed by the second firewall processing device instructs a second IO firewall virtual machine executed by the second network access device to update the second flow table.

14. The non-transitory computer-readable medium of claim 11, wherein the IO firewall virtual machine and a first firewall services processing virtual machine executing at the firewall processing device collectively represents a distributed firewall.

15. A network system, comprising:
a first network access device having an input/output (TO) module of a first firewall to capture a packet of a network session originated from a first node associated with the first network access device, wherein the packet is identified by the first firewall of the first network device as a specific type of packet indicative of an occurrence of a live migration of a virtual machine (VM);
a first firewall processing device, associated with but separated from the first network access device, having a firewall processing module to determine in response to receipt of the packet captured by the first firewall of the first network device, that the first node is a destination node of a VM migration from a second node that is associated with a second network access device, wherein the first node is determined to be the destination node of the live migration of the VM when the first firewall processing device both identifies the packet as the specific type of packet and determines that an amount of incoming packets of network traffic transferred to the first node by a live migration transfer protocol prior to the specific type of packet being captured by the first network access device exceeds a predetermined threshold, and wherein the first firewall processing device is to, in response to the determination that the first node is the destination node of the VM migration, update a first flow table within the first network access device for routing further packets of the network session to and from the first node; and
a second firewall processing device to receive a message from the first firewall processing device concerning the VM migration, wherein the second firewall processing device is to update a second flow table of the second network access device in response to the message, such that further network traffic of the network session will be routed to the first node without interrupting the network session.

16. The system of claim 15, wherein the specific type of the captured packet is an address resolution protocol (ARP) packet or a reverse ARP (RARP) packet transmitted by the first node.

17. The system of claim 15, wherein the first node is a member of a first local area network (LAN) hosted by the first network access device and the second node is a member of a second LAN hosted by the second network access device.

18. The system of claim 15, wherein the first firewall is an IO firewall virtual machine executed by the first network access device, and wherein the packet is captured by an input/output (TO) module of the IO firewall virtual machine within the first network access device.

19. The system of claim 18, wherein the first firewall processing device executes a first firewall services processing virtual machine that communicates with the first IO firewall virtual machine to update the first flow table and communicates with the second network access device to update the second flow table.

20. The system of claim 18, wherein the first firewall services processing VM executed by the first firewall processing device updates the first flow table of the first network access device using the IQ firewall virtual machine and communicates with a second firewall services processing VM executed by a second firewall processing device associated with the second network access device, wherein the second firewall services processing VM executed by the second firewall processing device instructs a second IQ firewall virtual machine executed by the second network access device to update the second flow table.

* * * * *